March 9, 1926.  G. MENDELL  1,576,346
GAUGE
Filed July 14, 1924   2 Sheets-Sheet 1

Inventor
G. Mendell.

By Lacey & Lacey, Attorneys

March 9, 1926.  1,576,346
G. MENDELL
GAUGE
Filed July 14, 1924  2 Sheets-Sheet 2
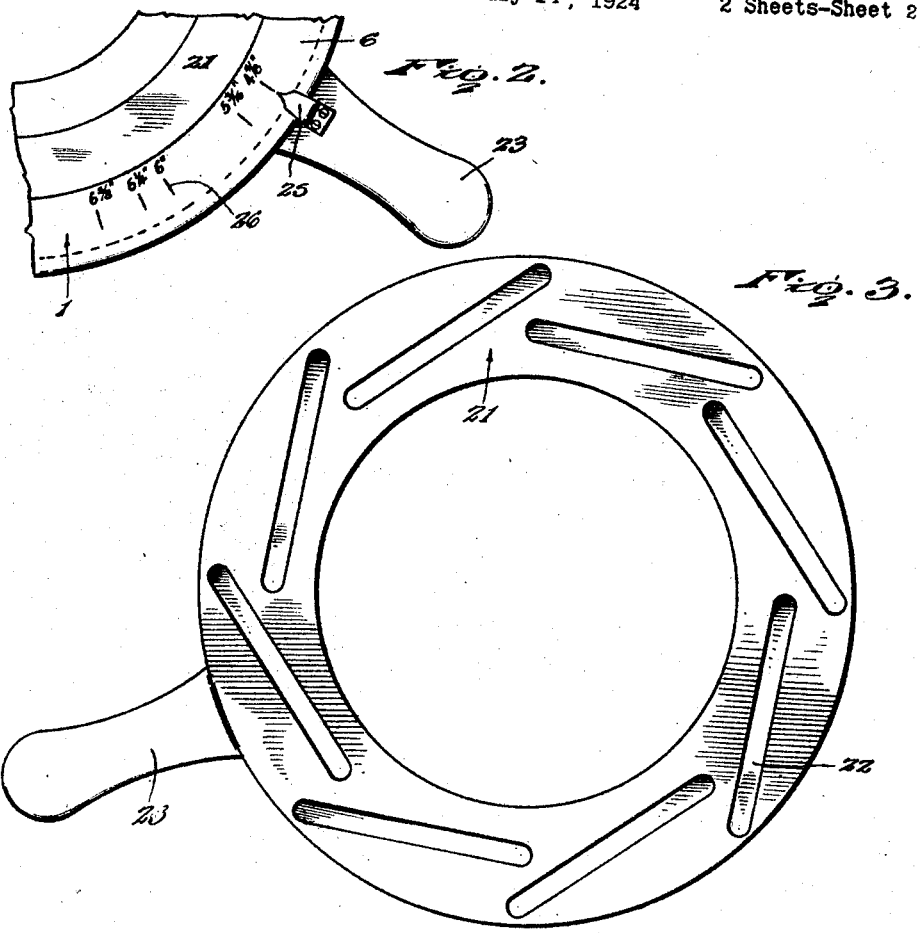
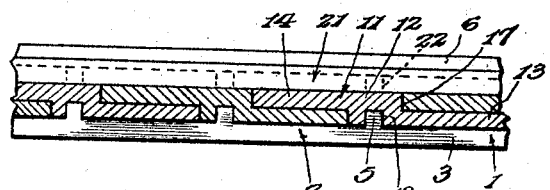
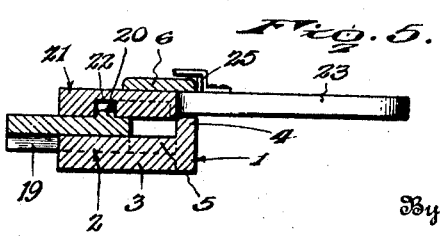
Inventor
G. Mendell.
By
Lacy & Lacy, Attorneys Patented Mar. 9, 1926.

1,576,346

UNITED STATES PATENT OFFICE.

GLENN MENDELL, OF MORAN, KANSAS.

GAUGE.

Application filed July 14, 1924. Serial No. 726,012.

*To all whom it may concern:*

Be it known that I, GLENN MENDELL, citizen of the United States, residing at Moran, in the county of Allen and State of Kansas, have invented certain new and useful Improvements in Gauges, of which the following is a specification.

This invention relates to improvements in diameter gauges and more particularly to a gauge for employment in oil fields and designed for application to drill bits during the process of dressing the same.

One of the important objects of the invention is to provide a gauge of this class which may be readily applied to and removed from the bit and quickly adjusted at the time of its application, to encircle the bit and indicate the diameter thereof.

Another object of the invention is to provide a gauge of the class described which will be simple and durable in construction and not liable to disarrangement of its parts.

A further object of the invention is to so construct the gauge that by manipulation of a single member, the gauge may be closed about the bit to be measured and, after the measurement has been taken, as readily opened by the same member thereby obviating the employment of complicated and slow acting adjusting parts.

In the accompanying drawings:

Figure 2 is a plan view of a portion of the gauge, which portion is substantially that broken away in Figure 1.

Figure 3 is a bottom plan view of the adjusting ring of the gauge.

Figure 4 is a sectional view taken substantially on the line 4—4 of Figure 1, looking in the direction indicated by the arrows.

Figure 5 is a diametric sectional view taken substantially on the line 5—5 of Figure 1, looking in the direction indicated by the arrows.

Figure 1:
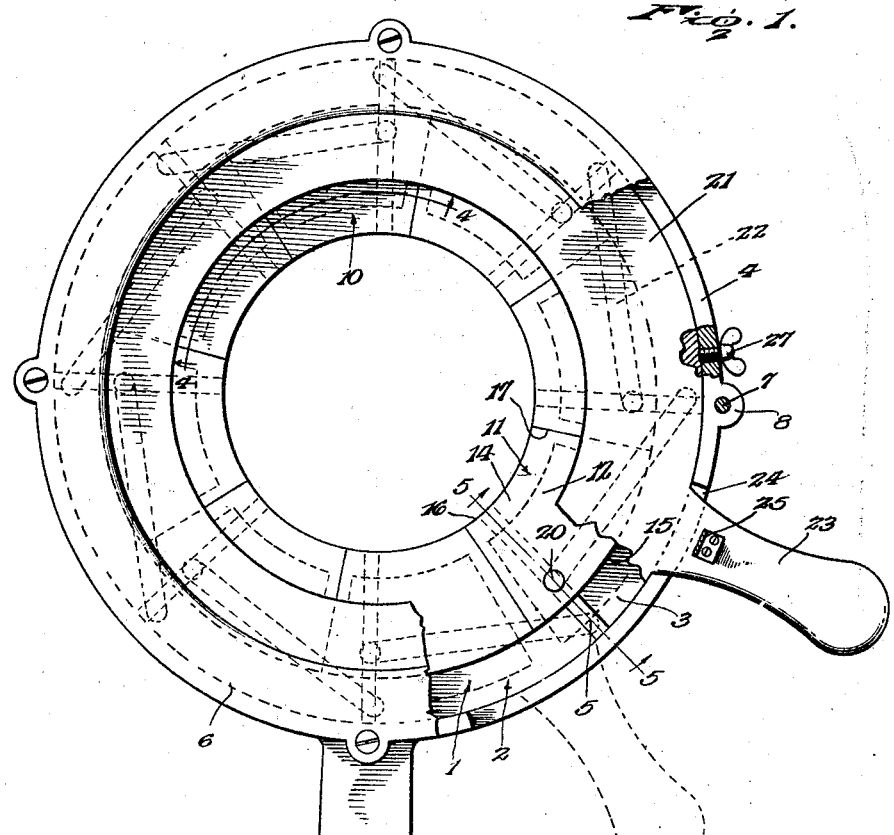
Figure 1 is a plan view of the gauge embodying the invention, parts being broken away to better illustrate the construction, and the adjusting ring of the gauge being shown in one position in full lines and in another position in dotted lines, as well as the segments which are adjusted by the said ring.

The gauge embodying the invention comprises a casing which is indicated in general by the numeral 1 and which includes a body member indicated by the numeral 2, the said body member including an annular bottom 3 having an upstanding circumferential relatively shallow wall 4 at its outer periphery. For a purpose to be presently explained, the bottom 3 of the body of the casing is provided upon its upper side with an annular series of suitably spaced radial guide ribs indicated by the numeral 5. The casing is completed by a cap ring 6 which is of annular form and which is removably secured in place upon the upper edge of the wall 4 by means of screws or bolts 7 fitted through openings in the said cap ring and into bosses 8 formed at intervals about the outer side of the wall 4, it being understood that the cap ring overlies the bottom of the body of the casing in spaced relation thereto, as clearly shown in Figure 5 of the drawings.

The numeral 9 indicates a handle which may be grasped for the purpose of supporting the gauge while it is being applied to the drill to be gauged, and this handle extends radially outwardly from the body 2 of the casing of the gauge.

Figures 6, 7:
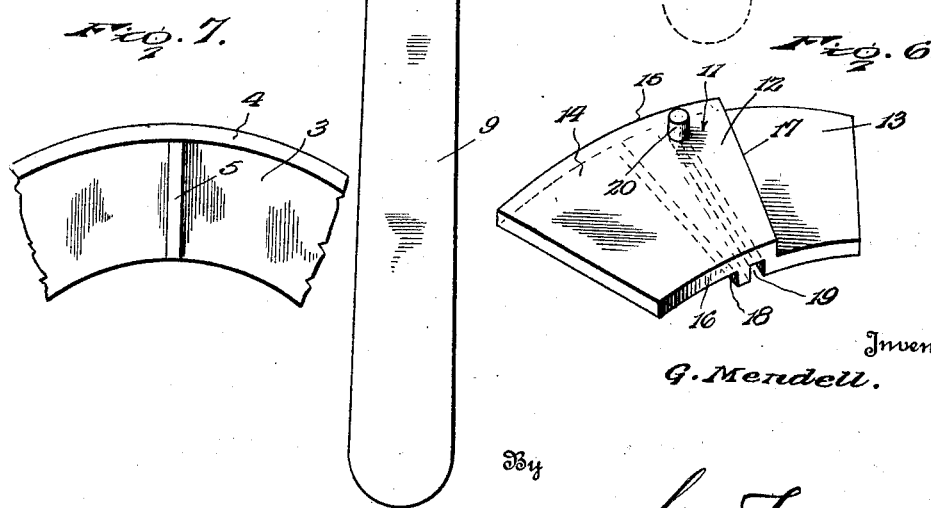
Figure 6 is a perspective view of one of the adjustable segments of the gauge.
Figure 7 is a fragmentary plan view of a portion of the casing of the gauge.

The numeral 10 indicates in general, an assemblage of segments, the individual segments being indicated in general by the numeral 11 and all being of counterpart form. Each of these segments comprises a body portion 12 from one side of which there extends a lip 13 and from the other side thereof a lip 14, the lips 13 and 14 occupying vertically offset planes and the under side of the lip 14 being in a plane with the upper side of the lip 13, the upper side of the lip 14 being likewise flush with the upper side of the body portion 12 and the under side of the lip 13 being flush with the under side of the said body portion. As will be observed by reference to Figures 1 and 6 of the drawings, each segment is of arcuate form, having concentric arcuate outer and inner edges indicated respectively by the numerals 15 and 16, and each extending from the outer side edge of lip 13 to the outer side edge of the lip 14. Likewise, due to the offsetting of the lips 13 and 14, the body portion 12 has radial upper and lower shoulders 17 and 18 respectively defining the inner boundaries of the said lips 13 and 14. For a purpose to be presently described, the body portion 12 of the segments is formed in its under side with a groove 19 radially centrally disposed between the shoulders 17 and 18, and the said body portion 12 is provided upon its upper side with an upstanding stud indicated by the numeral 20 and adjacent the edge 15 of the segment, this stud being located above the outer end of the groove 19. By reference to Figures 1 and 4 of the drawings, it will be observed that the segments are arranged in an annular series upon the upper side of the bottom 3 of the body of the casing with the ribs 5, upon said bottom, engaging in the grooves 19 in the segments and with the lip 14 of each segment overlapping the lip 13 of the next adjacent segment, the edges 16 of the several segments being, of course, presented inwardly. At this point it will be understood that the segments are movable over the upper side of the bottom 3 of the casing in radial direction and are guided in such movement by the engagement of the ribs 5 in the grooves 19, and in order to effect such adjustment of the segments simultaneously, means is provided which will now be described.

The means referred to above comprises an adjusting ring which is indicated in general in the drawings by the numeral 21 and which is best illustrated in Figure 3 of the drawings. This ring is flat-sided and of annular form and is provided upon its under face with a number of grooves 22 arranged in an annular series. Each groove 22 extends on a line chordal to the periphery of the ring, as will be evident by reference to said Figure 3, and in crossed relation to a groove 19 at an oblique angle thereto, as indicated by dotted lines in Fig. 1. The grooves are of a width to accommodate the studs 20, it being observed by reference to Figures 1 and 5 of the drawings that said studs 20 of the several segments 11 are engaged in respective ones of the grooves 22. It will likewise be observed, by reference to Figure 3 of the drawings, that not only are the grooves 22 chordal to the periphery of the ring 21, but also that diametrically opposite ones of the grooves are parallel. The ring 21 is provided with an operating handle member 23 which extends radially from its outer periphery, and in assembling the ring with the segments 11, the ring is disposed in position resting upon the upper sides of the segments and with the grooves 22 therein receiving said studs 20, the handle member 23 extending through a recess 24 formed in the upper side or edge of the wall 4 of the body of the casing for a portion of its circumference, this recess being closed at its top by the peripheral portion of the cap ring 6, the cap ring likewise overlying and retaining in place, for rotary adjustment, the adjusting ring 21.

It will now be understood that by rotating the adjusting ring 21 through the medium of the handle 23, the point at which the grooves 22 cross their cooperating grooves 19 will move longitudinally of the grooves 19 and the gauge segments 11 may be adjusted radially inwardly and outwardly as the walls of the grooves 22 ride against the sides of the studs 20. Therefore, when the gauge is applied to a drill bit, the handle 23 may be manipulated so as to bring the inner edges 16 of the said segments into contact with the surface of the bit. In order that the diameter of the bit thus gauged may be determined, a pointer 25 is fixed upon the handle member 23 and overlies the cap ring 6 and is designed for registration with the marks of a scale 26 indicated upon the upper side of the cap ring opposite the said pointer.

In order that the adjusting ring 21 may be held in any desired position of adjustment, a set screw 27 is inserted through the wall 4 of the body of the casing and may be adjusted to bind against the periphery of the said adjusting ring.

From the foregoing description of the invention it will be evident that the gauge embodying the same may be readily and quickly adapted to a bit to be engaged and the diameter of the bit determined at a glance at the scale 26 and pointer 25. It will also be evident that the parts are so constructed and assembled that there will be no likelihood of a disarrangement of the parts.

Having thus described the invention, what I claim is:

1. A gauge comprising an annular casing, an annular series of gauge segments mounted within the casing for radial adjustment, and each having a seat in one face disposed intermediate its width and extending radially of the casing, ribs carried by said casing and fitting into said seats to guide sliding movement of the gauge elements, a rotatable adjusting ring in the casing, having grooves extending chordally with relation to the periphery of the ring and in crossed relation to said ribs at oblique angles thereto, and studs upon the segments disposed over said ribs and engaging in the said grooves whereby rotation of the ring will effect adjustment of the segments.

2. A gauge comprising an annular casing, an annular series of gauge segments mounted within the casing for radial adjustment and each comprising a body portion and laterally disposed lips extending therefrom and relatively vertically offset, the lips of the said segments throughout the series mutually overlapping, each segment having an arcuate engaging edge presented inwardly, means guiding the segments, a rotatable adjusting ring in the casing, and coacting means upon the ring and the segments for effecting adjustment of the segments upon rotation of the ring.

3. A gauge comprising an annular casing, an annular series of gauge segments mounted in the casing for radial adjustment, each of said segments comprising a body portion having a radial groove in its under side and lips projecting from opposite sides of the body portion, the lips being relatively offset in a vertical direction with the under side of the more elevated lip occupying a horizontal plane with the upper side of the other lip, the segments being arranged with the more elevated lip of each segment overlapping the second mentioned lip of the next adjacent segment, ribs upon the bottom of the casing engaging in the said grooves in the body portions of the segments whereby to guide the segments in their movement, studs upon the segments, and a rotatable adjusting ring within the casing having chordal grooves extending in crossed relation to said ribs at oblique angles thereto and receiving the said studs whereby to effect radial adjustment of the segments upon rotation of the ring.

4. A gauge comprising an annular casing having top, bottom, and circumferential walls provided with a circumferential extending slot, an annular series of gauge segments mounted within the casing upon the bottom thereof for radial adjustment, means guiding the segments, an adjusting ring rotatably mounted within the casing between the segments and the top wall of the casing and having a handle extending through the slot in the circumferential wall of the casing, coacting means upon the said ring and the said segments for effecting adjustment of the segments when the ring is rotated, a pointer upon the said handle, and a scale upon the said top wall of the casing with which the pointer is to coact in the movement of the handle to rotate the said adjusting ring.

5. A gauge comprising an annular casing having top, bottom, and circumferential walls provided with a circumferentially extending slot, an annular series of gauge segments mounted within the casing upon the bottom thereof for radial adjustment, means guiding the segments, an adjusting ring rotatably mounted within the casing between the segments and the top wall of the casing and having a handle extending through the slot in the circumferential wall of the casing, coacting means upon the said ring and the said segments for effecting adjustment of the segments when the ring is rotated, and a set screw threaded through the circumferential wall of the casing and coacting with the periphery of the adjusting ring to secure the ring in positions of rotative adjustment.

In testimony whereof I affix my signature.

GLENN MENDELL. [L. S.]